Sept. 18, 1956     B. F. SHAUGHNESSY     2,763,375
APPARATUS FOR PURIFYING WATER
Filed Jan. 18, 1955     4 Sheets-Sheet 1
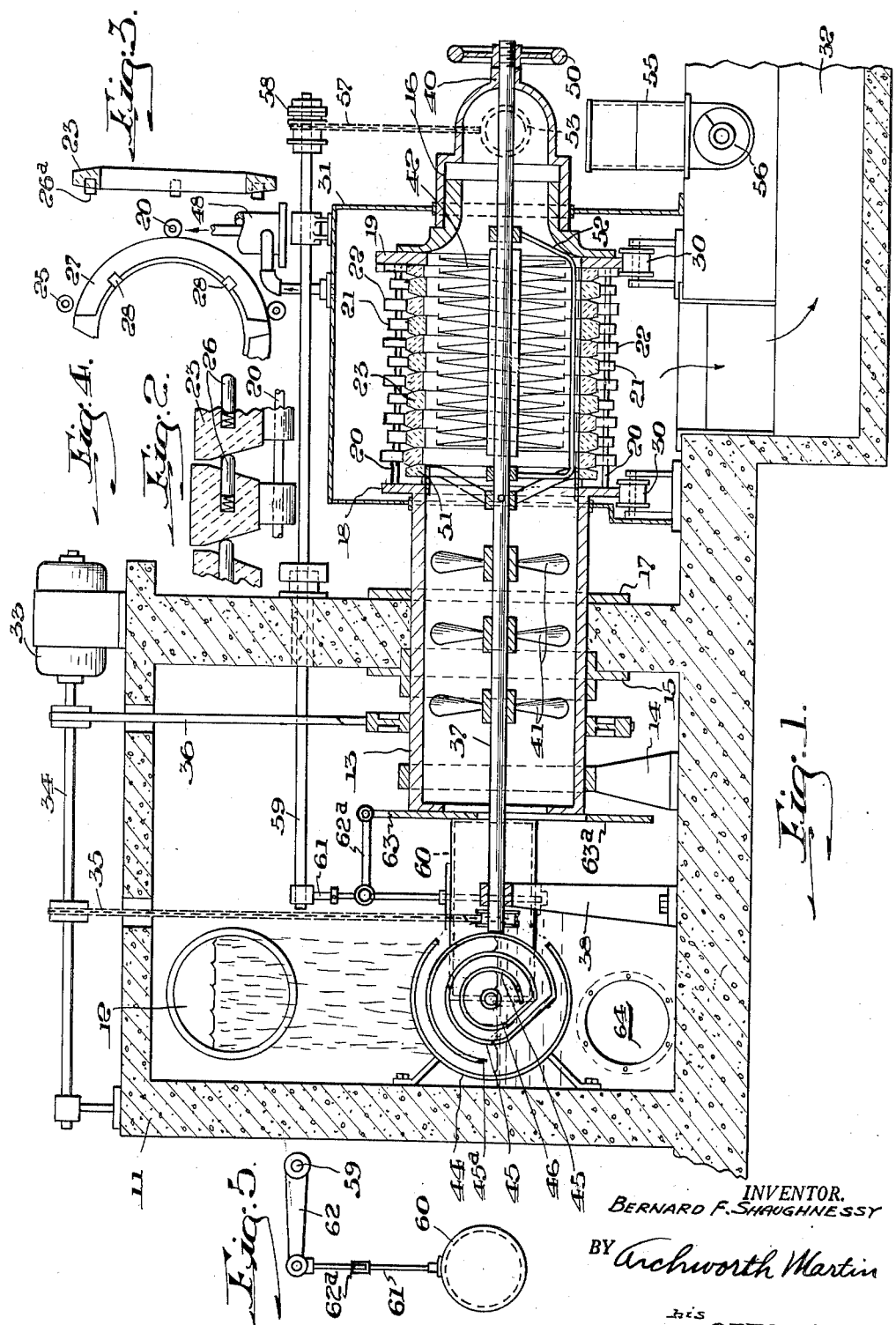
INVENTOR.
BERNARD F. SHAUGHNESSY
BY Archworth Martin
his ATTORNEY Sept. 18, 1956     B. F. SHAUGHNESSY     2,763,375
APPARATUS FOR PURIFYING WATER
Filed Jan. 18, 1955     4 Sheets-Sheet 2

INVENTOR.
BERNARD F. SHAUGHNESSY
BY Archworth Martin
his ATTORNEY.

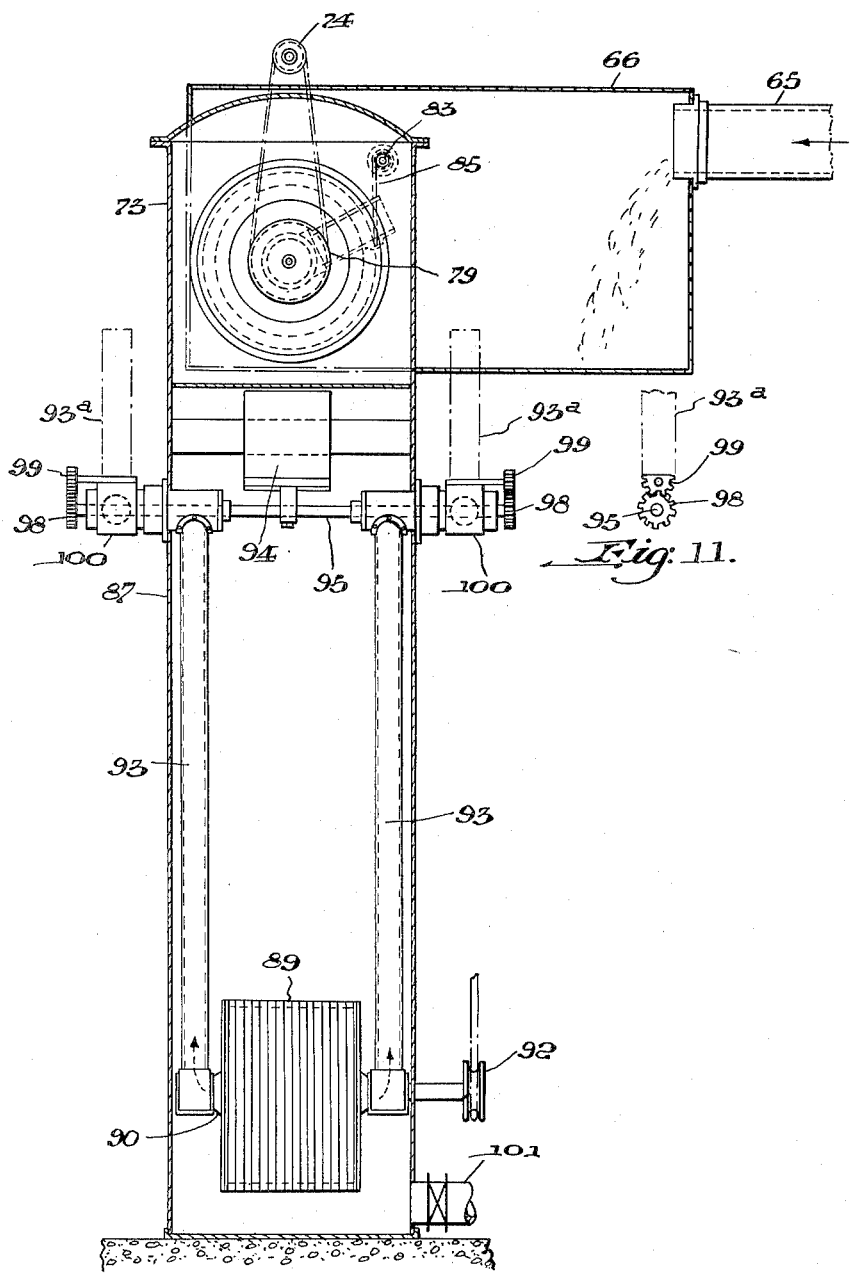

United States Patent Office 2,763,375
Patented Sept. 18, 1956

2,763,375

APPARATUS FOR PURIFYING WATER

Bernard F. Shaughnessy, Catasaqua, Pa.

Application January 18, 1955, Serial No. 482,496

11 Claims. (Cl. 210—199)

My invention relates an improved manner of water purification, and particularly in the removal of solids therefrom, as in the case of domestic sewage and the like.

The invention has for its object the provision of an improved means for separating solids from liquids in a more effective manner than various screening and sedimentation devices heretofore employed, the sewage during movement through my system being subjected to considerable agitation and hence exposure to the oxygen in the air whereby various harmful bacteria are consumed.

Some of the forms which my invention may take are shown in the accompanying drawings, wherein—

Figure 1 is a longitudinal sectional view through a sewage collecting sump and screening apparatus for receiving the sewage as it leaves the sump, to effect further separation of the water and solids;

Fig. 2 is an enlarged sectional view through some of the screening rings of Fig. 1;

Fig. 3 is a sectional view of another form of ring and spacer elements therefor;

Fig. 4 is a fragmentary face view showing a modification wherein another form of spacer element is employed between the rings;

Fig. 5 is a view showing the manner in which a float is employed in the sump chamber to operate a discharge orifice or valve at the outlet end of the chamber, to thereby control the liquid level in the sump and in the screening chamber;

Fig. 10 is a sectional view thereof, taken at right angles thereto, and

Fig. 11 is a detailed view showing the manner in which discharge from the treating chamber is controlled.

Figure 6:
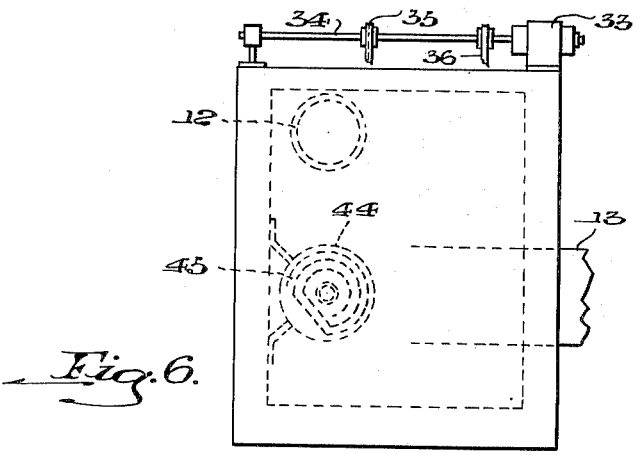
Fig. 6 is a reduced side view of a portion of the sump of Fig. 1.

Referring first to Figs. 1 to 8, the system comprises a sump 11 into which sewage or other solid liquid is introduced through a sewer 12. A screening drum 13 is rotatably supported in bearings at 14, 15 and 16, there being a close fit at 15 and by a washer 17 to prevent leakage from the sump.

The drum has a flange 18 that is connected to an annular ring or flange 19 by tie rods 20, the rods 20 serving to support rollers 21 and 22 that are of slightly eccentric contour relative to the rods 20, to provide for radial shifting of screening rings 23 that rest upon and between the rollers, during rotation of the drum. As shown in Fig. 2, the rings have thickened bases whose sides are radially parallel for substantial distances.

Radial shifting of the rings relative to one another can be had also simply by providing for some clearance between the rings and the rollers, as indicated at the roller 25 in Fig. 4, since during each revolution of the drum, rings will move against the rollers successively as they come to the lower part of their path of travel, under the action of gravity.

Also, the rings can have relative idling rotative movement during rotation of the drum. These relative radial and rotative movements in radial planes have the effect of preventing clogging of the spaces between the rings, which spaces may be as little as .002 inch.

The rings may be separated by spring-pressed plungers 26 as in Fig. 2; or by yieldable buttons 26a of Fig. 3, or by interspersed flat rings 27 that have protrusions 28 which may suitably be of spring metal, so that the rings can be adjusted toward and from one another as hereinafter explained, to vary the spacing or screen openings between the rings.

The drum flanges 18—19 are rotatably supported by four idle rollers 30, only two of which are here shown. A casing or hood 31 partially encloses the drum and is open at its lower side for discharge of water to a conduit 32.

A motor 33, through a shaft 34 and chain drive 35 and belt 36, rotates the drum 13 and a shaft 37 respectively, suitable reduction gearing being provided so that the shaft is not rotated too rapidly to permit of adequate separation of water from the solids during movement of the sewage through the drum 13. The shaft 37 is supported in bearings at 38 and 40 and carries impellers 41 of the paddle type and a screw conveyor 42, the conveyor 42 serving to advance the body of the liquid through the drum with considerable force while the impellers 41 are angled in a direction to effect some backward flow of floating solids near the surface of the stream of sewage which is maintained at about the level of the shaft 37.

As the sewage is advanced through the drum, under the propelling force of the conveyor 42, the paddles 41 exert a backward thrust on the solids to simply retard them or to push them into a shield or hood 44 within which is contained a scoop 45 of spiral form that is closed at its ends and will scoop up the flotsam or solids. The scoop is rotated (Fig. 7) in a suitable manner by a tubular shaft 46 to which it is rigidly connected by a pair of bearing rings 46a by welding or otherwise. The shaft 46 has an opening 46b through which the sewage from the scoop 45 will enter, for discharge into the chamber of a housing 47 at the outer end of the shaft. The solids intermixed with a considerable quantity of water are drawn into the center of the scoop and conducted into the chamber 47, from which the solids are conveyed to a drying station and perhaps later incinerated, as hereinafter explained.

While the paddles 41 may not at all times actually create a back flow of the floating solids, they will exert a retardent or damming effect that will cause them to accumulate at the open side of the shield 44, into which they will be drawn by reason of discharge through the tubular shaft 46. If there is only a small amount of solids, the scoop 45 will be stopped with its edge 45a above the water level, or rotated only intermittently.

The shaft 46 is driven by a pulley 48a and is closed at its inner end by a plate 49 that serves as a bearing for a shaft 105 that is driven by a pulley 106, from a suitable power source. At its outer end, the shaft is supported in a bearing 107 that is secured to the inner wall of the housing 47. A conveyor sprocket 108 is driven by the shaft 105. An elongated casing 109 slopes upwardly from the housing 47 and serves as an enclosure for a conveyor 110 that extends around a sprocket 111 which is journaled in the upper end of the casing 109 which has a spout 112 for discharge into a drier or incinerator.

Figures 7, 7A:
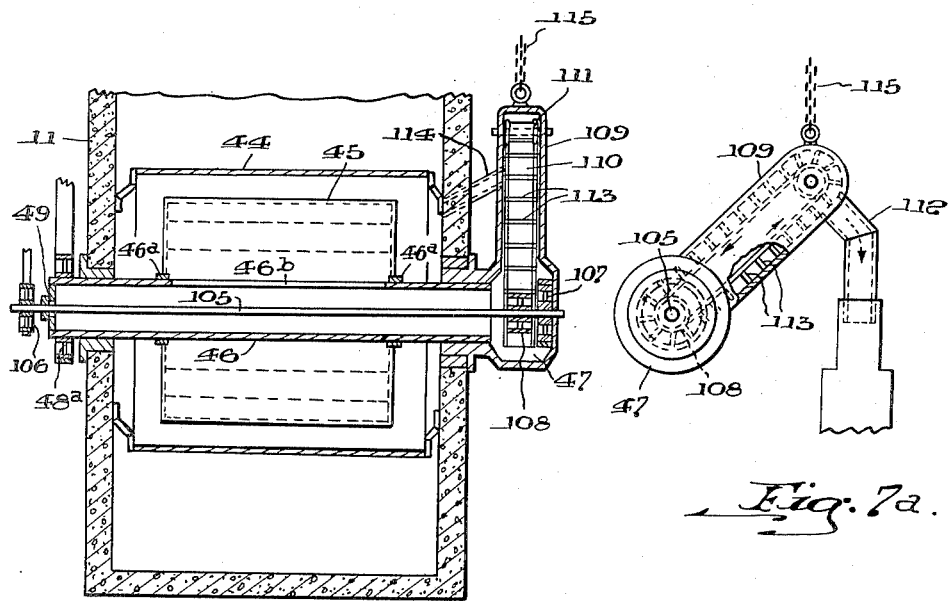
Fig. 7 is a cross sectional view at the rear end of the sump, partly in section.
Fig. 7a is a fragmentary end elevation thereof.
Figure 8:
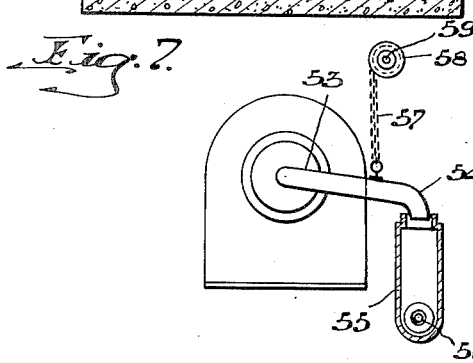
Fig. 8 is a view at the discharge end of the system of Fig. 1, showing the manner in which the float of Fig. 5 controls discharge of partially de-watered sludge from the screening drum.

The conveyor 110 is of belt-like form having scraper blades 113 which move upwardly along the lower inner wall of the casing 109 as indicated in Fig. 7a. The casing serves as a conveyor trough, so that solids are moved upwardly by the conveyor blades 113 and then discharged at 112.

At a height slightly above the normal water level in the sump 11, a discharge pipe 114 conducts water and remnants of solids from the casing 109 into the sump 11, for movement into the drum 13.

As hereinafter explained, the water level in the sump is primarily controlled at the discharge end of the drum 13, but I provide a hanger chain for adjusting the outer end of the casing 109, to control water flow through the chamber 47 and the casing 109, the pipe 114 being of flexible material, to permit of such adjustments.

As the main body of liquid is advanced through the drum, it passes the screening rings 23 and water is drained through the rings by gravity and also drawn by suction within the upper portion of the casing 31 by a vacuum pump 48. A considerable quantity of water will be drawn from between the rings 23 by this suctional force, above the level of the shaft 37, particularly because of the close spacing of the rings, a considerable quantity of water is carried between them during rotation into the upper half of their path. This water will flow to the conduit 32. The suctional force also reduces tendency toward clogging of the spaces between the screening rings.

The spacing between the rings is controlled by a hand wheel 50 that has threaded engagement with the shaft 37, so that the wheel can be turned to shift the shaft axially somewhat, carrying with it a presser ring or collar 51 that is keyed thereto, thereby compressing the yieldable bosses 26 or 28. When the hand wheel 50 is turned in the reverse direction, the bosses will expand to increase the spacing between the rings. A scraper bar 52 of yoke-like form is idlingly suspended on the shaft 37 to have scraping engagement with the inner peripheral surfaces of the rings and to agitate solids that tend to settle in the drum.

After withdrawal of the major portion of the water from the sewage, the thickened sludge-like residue which, however, is of considerable fluidity will be discharged through an outlet 53 into a spout 54 and thence to a hopper 55 from which a screw conveyor 56 will convey it to a drying bed or incinerator. The spout 54 is automatically raised and lowered by a chain 57 to control the liquid level in the drum. This chain is wound on a reel 58 carried by a rock shaft 59 which is oscillated by a float 60 whose stem 61 is pivotally connected to a crank arm 62 on the shaft 59. When the water level in the sump and the drum rises above a desired level, the shaft 59 will be rocked in a direction to lower the spout 54. Contrarywise, when the water level falls, the float will rock the shaft 59 in a direction to raise the outer end of the spout 54 slightly. The float stem 61 has an extension 62a with a rod 63 for raising and lowering a valve plate 63a with rise and fall of the float, to thereby control the liquid level. A clean-out opening 64 is provided for removing sludge from the sump.

Figure 9:
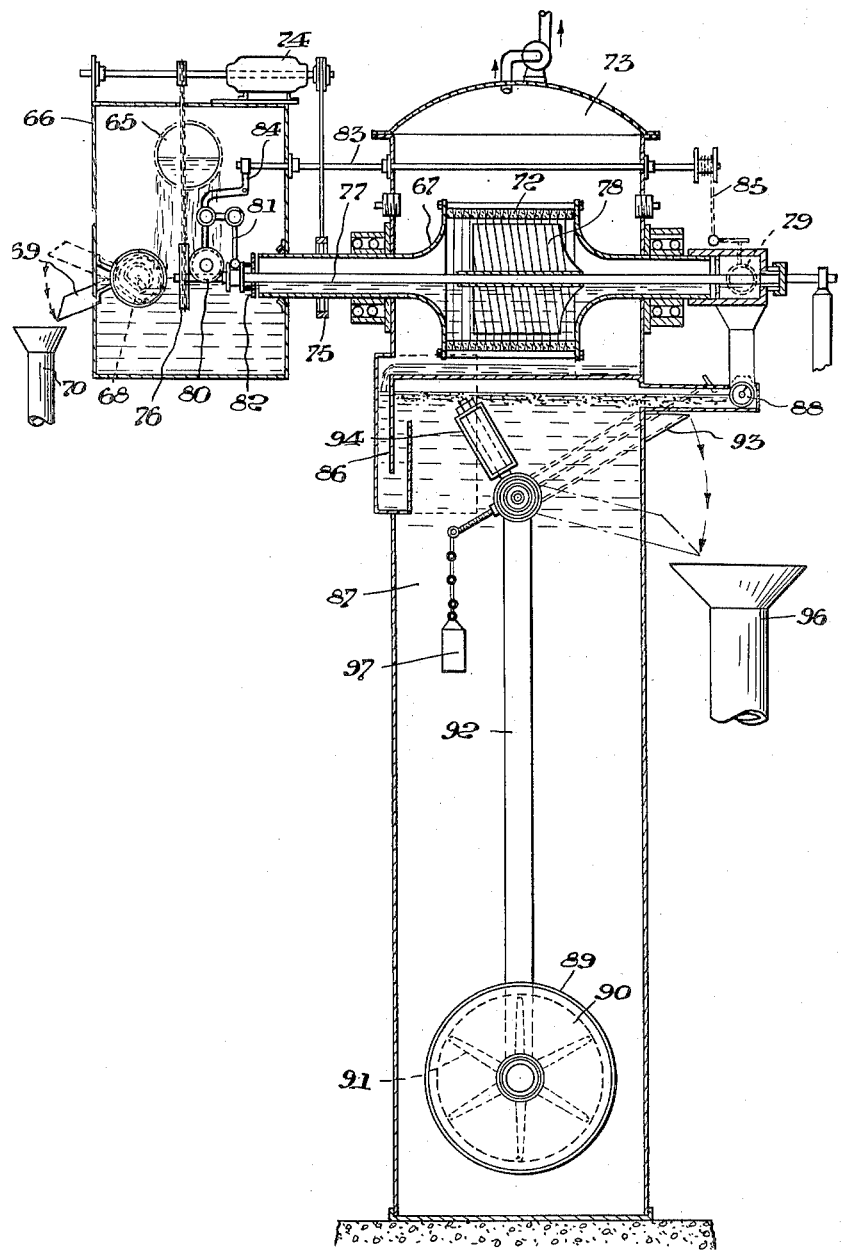
Fig. 9 is a vertical sectional view through a modified form of treating apparatus.

Referring now to Figs. 9 and 10, I show an alternative arrangement, wherein the sewage is introduced from a sewer 65 into a tank 66 from whence it flows into a drum 67 that corresponds to the drum of Fig. 1. Here, too, a skimmer or scoop 68 serves to discharge floating solids into a spout 69 and a pipe 70. The drum 67 that corresponds to the drum 13 of Fig. 1 has screening rings 72 and is contained within a suction chamber 73. A motor 74 drives pulleys 75 and 76 on the drum and a conveyor shaft 77 respectively, the shaft carrying a screw conveyor 78 that advances the partially drained solids to a discharge outlet 79. A float 80 operates a bell crank 81, one arm of which operates a slide valve or gate 82 to control the rate of flow from the chamber 66 into the drum 67, thereby preventing too high level of sewage in the drum.

The float also operates a rock shaft 83, through a crank 84 to oscillate the same in a manner similar to that operation of the rock shaft 59. At its outer end, the shaft 83 has connection through a pull rope 85 with a discharge spout leading from the outlet 79 as in the case of the spout 54 of Fig. 8.

The water which is drained from the sewage passing through the drum 67 will flow past a baffle 86 into a tank 87. Scum or other floating solids will flow off the top of the liquid in the tank 87 through an outlet 88 that may have a screw conveyor therein. The main body of the liquid moves down through the tank and through screening rings 89 into a drum 90 within which are vanes 91 that are rotated from a pulley 92, to stir and agitate the sewage. The screening rings are similar to those of Fig. 1, but in this case, the solids are retained exteriorly of the drum and the water flows into the drum and upwardly as indicated by the arrows, through pipes 93, from whence it enters discharge pipes or troughs 93a.

When the level in the tank has raised to a sufficiently high point, a float 94 will rock a shaft 95 which carries the outlet pipes 93, to bring their outer ends downwardly for discharge into a hopper 96, as indicated by the arrows in Fig. 9.

When the water is below a normal desired level, a weight 97 will return the discharge pipe 93 to its upper position, as shown in Fig. 9. The motion from the shaft 95 to the spouts 93 is transmitted from gear wheels 98 on the ends of the shaft 95, to pivotally-mounted gear segments 99 that are connected to the spouts 93, the gear segments and the spouts being mounted on sleeves 100 that are rotatably supported on extensions of the shaft 95. A clean-out opening for periodically removing sludge is shown at 101.

I claim as my invention:

1. Apparatus for separating solids from liquids, comprising a drum rotatable on a horizontal axis and having a discharge opening at approximately its axis adjacent to one end of the drum, means for directing a mixture of liquid and solids into the other end of the drum, that portion of the drum adjacent to the discharge end being of cage-like form, with axially-spaced ring-like flanges that are connected by bars, screening rings loosely supported by said bars, for relatively rotatable idling movement coaxially with the drum, a water-collecting housing surrounding the screening rings and having an outlet opening, a shaft extending into the drum and rotatable relative to the drum, impellers on the shaft, positioned to break solids as they move toward the discharge opening, and means for rotating the shaft and the drum independently of each other.

2. Apparatus as recited in claim 1, wherein the screening rings are of generally keystone shape in transverse section with their wider surfaces innermost.

3. The combination with a rotatable drum of horizontal cylindrical, cage-like form and means for directing a flow of liquid therethrough from an inlet at one end to a discharge opening that is located adjacent to the axis of the drum, at its other end, of a screen disposed circumferentially of the body of liquid moving through the drum, the screen comprising rings of generally keystone shape in transverse section, bars on the drum loosely supporting the rings for limited movements independently of one another in radial planes relative to the axis of the drum, spacing elements between the rings, and a drain for conducting liquid from the area around the rings.

4. Apparatus as recited in claim 3, wherein the rings taper outwardly at their peripheries and have axially wider radial areas near their innermost surfaces, each ring having its said radial areas parallel for a substantial distance adjacent to its innermost surface.

5. Apparatus as recited in claim 3, wherein the spacers between the rings are yieldable, and means are provided for adjusting the rings axially with relation to one another.

6. A screening device comprising a rotatable support, screening rings disposed in the support in axially-spaced relation about a horizontal axis, each ring being idly rotatable on the support, means for directing a flow of liquid radially through the group of rings, and means for directing the screened and the unscreened portions of the body of liquid to separate discharge paths.

7. The combination with a rotatable cage-like drum of horizontal cylindrical form and means for directing a flow of liquid therethrough from an inlet at one end to a discharge opening that is located adjacent to the axis of the drum, at its other end, of a screen disposed circumferentially of the body of liquid moving through the drum, the screen comprising rings in axially-spaced relation, bars on the drum loosely supporting the rings for limited radial movements independently of one another during rotating of the drum, and spacing elements between the rings.

8. Apparatus as recited in claim 7, wherein the said movements of the rings are both radially and circumferentially of the drum axis.

9. A screening device comprising a cage-like drum having a group of screening rings carried by the drum in axially-spaced relation, means for directing a stream of liquid and solids against one of the annular faces of the drum, to effect escape of the liquid through the spaces between the rings, a member in the drum for agitating the mixture of liquid and solids, means for moving the rings relative to one another, and means for directing the screened and the unscreened portions of the liquid and solids into separate paths.

10. A screening device comprising a cage-like drum, a group of screening rings carried by the drum in axially-spaced relation, means for directing a stream of liquid and solids against one of the annular faces of the drum, to effect escape of the liquid through the spaces between the rings, yieldable spacing elements between the radial faces of the rings, and means for adjusting the rings in opposition to the said elements, to vary the spaces between the rings.

11. A screening device comprising a rotatable support, screening rings on the support, disposed in axially-spaced relation about a horizontal axis, means for moving each ring in radial planes, and means for directing a flow of laden liquid radially through the group of rings, the rings being of generally keystone shape in transverse section and the flow of liquid directed radially from their wider faces toward their narrow faces.

References Cited in the file of this patent

UNITED STATES PATENTS

| | | |
|---|---|---|
| 1,758,284 | Gronning | May 13, 1930 |
| 1,877,450 | Fulcher | Sept. 13, 1932 |
| 2,092,252 | Hillier | Sept. 7, 1937 |
| 2,146,692 | Tiedman | Feb. 7, 1939 |
| 2,228,185 | Thompson | Jan. 7, 1941 |
| 2,358,779 | Tholl | Sept. 26, 1944 |
| 2,650,710 | Stehling | Sept. 1, 1955 |